(12) United States Patent
Marumoto

(10) Patent No.: US 8,129,027 B2
(45) Date of Patent: Mar. 6, 2012

(54) INTERLAYER FILM FOR LAMINATED GLASS AND LAMINATED GLASS

(75) Inventor: Tadashi Marumoto, Shiga (JP)

(73) Assignee: Sekisui Chemical Co., Ltd., Osaka (JP)

( * ) Notice: Subject to any disclaimer, the term of this patent is extended or adjusted under 35 U.S.C. 154(b) by 598 days.

(21) Appl. No.: 11/885,225

(22) PCT Filed: May 30, 2007

(86) PCT No.: PCT/JP2007/060982
§ 371 (c)(1), (2), (4) Date: Aug. 28, 2007

(87) PCT Pub. No.: WO2007/142095
PCT Pub. Date: Dec. 13, 2007

(65) Prior Publication Data
US 2009/0305059 A1     Dec. 10, 2009

(30) Foreign Application Priority Data

May 31, 2006   (JP) .................. 2006-151096

(51) Int. Cl.
*B32B 17/10* (2006.01)
(52) U.S. Cl. ........................ 428/436; 428/437
(58) Field of Classification Search .......... 428/437, 428/436
See application file for complete search history.

(56) References Cited

U.S. PATENT DOCUMENTS

| | | | |
|---|---|---|---|
| 6,903,152 B2 * | 6/2005 | Toyama et al. | 524/403 |
| 6,992,130 B2 | 1/2006 | Kusudou et al. | |
| 2006/0008658 A1 | 1/2006 | Fukatani et al. | |

FOREIGN PATENT DOCUMENTS

| | | |
|---|---|---|
| JP | 2001-163640 A | 6/2001 |
| JP | 2004-068013 A | 3/2004 |
| JP | 2005-206445 A | 8/2005 |
| WO | WO-01/19747 A1 | 3/2001 |
| WO | WO-2005-111170 A1 | 11/2005 |

OTHER PUBLICATIONS

International Search Report for PCT/JP2007/060982, mailed on Sep. 18, 2007.

* cited by examiner

*Primary Examiner* — Dhirajlal S. Nakarani
(74) *Attorney, Agent, or Firm* — Cheng Law Group, PLLC

(57) ABSTRACT

The present invention provides an interlayer film for a laminated glass comprising a polyvinyl acetal resin, which is able to be easily adhered to a glass and is capable of constituting a laminated glass excellent in transparency, and also provides a laminated glass using the interlayer film. An interlayer film for a laminated glass comprising 100 parts by weight of a polyvinyl acetal resin and 60 to 100 parts by weight of a plasticizer, wherein 50 to 100% by weight of the plasticizer is a diester compound represented by the formula (1) below.

[formula 1]

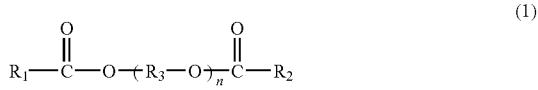

In the formula (1), $R_1$ and $R_2$ are each an organic group of 5 to 10 carbon atoms, $R_3$ is $-CH_2-CH_2-$, $-CH_2-CH(CH_3)-$, $-CH_2-CH_2-CH_2-$ or $-CH_2-CH_2-CH_2-CH_2-$, and n is an integer of 4 to 10.

4 Claims, No Drawings

INTERLAYER FILM FOR LAMINATED GLASS AND LAMINATED GLASS

TECHNICAL FIELD

The present invention relates to an interlayer film for a laminated glass, comprising a polyvinyl acetal resin, and specifically, an interlayer film for a laminated glass, which is able to be easily adhered to glass and is capable of constituting a laminated glass excellent in transparency, and also relates to a laminated glass using the interlayer film.

BACKGROUND ART

Since a laminated glass even when broken by external shocks is less likely to be scattered and thus is excellent in safety, it is in broad use for windowpanes of automobiles, railroad vehicles, aircrafts, vessels, buildings, and the like.

Such laminated glass includes those having an interlayer film for a laminated glass interposed between at least a pair of glass sheets and then uniting them. Usually, a plasticized polyvinyl acetal resin film, an ethylene-vinyl acetate copolymer resin film, an ethylene-acrylic copolymer resin film, a polyurethane resin film, a polyurethane resin film containing sulfur element, a polyvinyl alcohol resin film, and the like are used as the interlayer film for a laminated glass.

As the above-mentioned interlayer film for a laminated glass, patent literature 1 described below discloses an interlayer film comprising 50% to 80% by weight of PVB (acetalized polyvinyl alcohol) and 20% to 50% by weight of a softener. In the interlayer film described in the patent literature 1, 30% to 70% by weight of the softener is polyalkylene glycol or its derivatives represented by the formulae (A1) to (A6) below.

(A1)

In the above formula (A1), R is an alkylene group and n is >5.

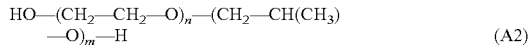
(A2)

In the above formula (A2), n is >2, m is >3, and (n+m) is <25.

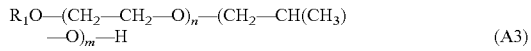
(A3)

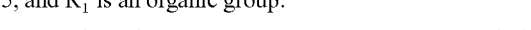
(A4)

In the above formula (A3) or (A4), n is >2, m is >3, (n+m) is <25, and $R_1$ is an organic group.

$R_1$—O—$(R_2$—O$)_n$—H (A5)

In the above formula (A5), $R_2$ is an alkylene group, n is ≧2, and $R_1$ is an organic group.

$R_1$—O—$(R_2$—O$)_n$—$R_3$ (A6)

In the above formula (A6), $R_2$ is an alkylene group, n is >5, and $R_1$ and $R_2$ are each an organic group.

In the composite safety glass composed of the interlayer film as mentioned in the patent literature 1, since the above-described specific compound is contained as a softener in a specific ratio as mentioned above, such composite safety glass has excellent sound insulation performance.
Patent Literature 1: WO 01/19747

DISCLOSURE OF THE INVENTION

In production of a laminated glass, an autoclave treatment under high temperature and high pressure is usually used so as to obtain a transparent laminated glass. An interlayer film as described in the patent literature 1 is adhered to a glass through the autoclave treatment to obtain a laminated glass.

However, in such an autoclave treatment, for example, severe processing wherein the interlayer film and the glass are press-bonded at 140° C. under a high pressure of 1.5 MPa for 20 minutes had to be carried out. Therefore, in order to perform such processing, large-sized and expensive equipment is required, and thus cost for production inevitably became to be high.

Accordingly, an interlayer film which does not require a large-sized and expensive equipment, and makes it possible to be adhered to a glass without an autoclave treatment, and is capable of obtaining a transparent laminated glass has been demanded.

In view of the present situation of the conventional arts above, an object of the present invention is to provide an interlayer film for a laminated glass, and also to provide a laminated glass using the interlayer film, wherein the interlayer film comprises a polyvinyl acetal resin for a laminated glass and can be easily adhered to the glass, and is capable of constituting a laminated glass excellent in transparency.

The interlayer film for a laminated glass according to the present invention comprises 100 parts by weight of a polyvinyl acetal resin and 60 to 100 parts by weight of a plasticizer, and 50% to 100% by weight of the plasticizer is a diester compound represented by the formula (1) below.

[formula 1]

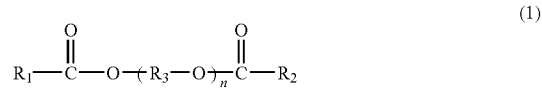
(1)

In the formula (1), $R_1$ and $R_2$ are each an organic group of 5 to 10 carbon atoms, $R_3$ is —$CH_2$—$CH_2$—, —$CH_2$—$CH(CH_3)$—, —$CH_2$—$CH_2$—$CH_2$—, or —$CH_2$—$CH_2$—$CH_2$—$CH_2$—, and n is an integer of 4 to 10.

In one specific aspect of the interlayer film for a laminated glass according to the present invention, 60 to 100% by weight of the plasticizer is a diester compound represented by the formula (1), and is a diester compound wherein $R_1$ and $R_2$ in the formula (1) are each an organic group of 6 to 8 carbon atoms.

In another specific aspect of the interlayer film for a laminated glass according to the present invention, the main component of the diester compound represented by the formula (1) is a diester compound of tetraalkylene glycol, wherein n is 4 in the formula (1).

The laminated glass according to the present invention comprises the interlayer film for a laminated glass, constituted according to the present invention, is adhered between at least two of transparent glass sheets.

Effect of the Invention

In the present invention, it is not necessary to perform the autoclave treatment, which has been conventionally performed in production, for composing a laminated glass, because 50 to 100% by weight of the plasticizer is a diester compound represented by the formula (1). That is, even non-autoclave treatment makes it possible to easily adhere the interlayer film to the glass, and no air bubbles remain on the adhesion surface between the interlayer film and the glass. Thus, a transparent laminated glass can be produced. Accordingly, since the press-bonding of the interlayer film and the glass under high temperature and high pressure is not required, large-sized and expensive equipment becomes unnecessary, resulting in reduction of production cost.

When 60 to 100% by weight of the plasticizer is a diester compound of the formula (1), and the main component of the diester compounds is a diester compound wherein $R_1$ and $R_2$ in the formula (1) are each an organic group of 6 to 8 carbon atoms, the interlayer film and the glass can be adhered each other under much milder conditions. And transparency of the laminated glass obtained is also improved.

In the case where the main component of the diester compounds of the formula (1) is a diester compound of tetraalkylene glycol in the formula (1) in which n is 4, adhesion of the interlayer film to the glass can be performed under much milder conditions, and laminated glass having more excellent transparency can be constituted.

Since in the laminated glass of the present invention, the interlayer film for a laminated glass constituted according to the present invention is adhered between at least two transparent glass sheets, adhesion strength between the glass and the interlayer film is increased and also the transparency of the glass is increased.

BEST MODE FOR CARRYING OUT THE INVENTION

Hereinafter, the present invention will be explained in detail.

The interlayer film for a laminated glass of the present invention comprises a polyvinyl acetal resin and a plasticizer.

The above polyvinyl acetal resin is a resin obtained by acetalization of a polyvinyl alcohol resin (PVA) with an aldehyde.

A production method of the polyvinyl acetal resin is not particularly limited, and for example, the following method is available. First, a polyvinyl alcohol resin is dissolved in warm water or hot water. The resulting aqueous solution is added with an aldehyde and a catalyst, while keeping the solution at a predetermined temperature of about 0 to about 95° C., and acetalization is carried out with stirring. Subsequently, the reaction temperature is raised, followed by aging, to complete the reaction. Then, a powdery polyvinyl acetal resin is obtained through some steps of neutralization, washing, and drying.

With respect to the polyvinyl alcohol resin used for the production of the polyvinyl acetal resin, there is no particular limitation thereon, and its average polymerization degree is preferably 500 to 5000, more preferably 1000 to 3000. If the average polymerization degree is less than 500, the strength of the interlayer film obtained becomes too weak, thus penetration resistance of the laminated glass finally formed is often deteriorated. If the average polymerization degree exceeds 5000, film formation of the interlayer film becomes difficult, and strength of the interlayer film obtained becomes too strong, sometimes resulting in reduction of the penetration resistance of the laminated glass finally formed.

Further, the average polymerization degree of the polyvinyl alcohol resin can be determined according to, for example, JIS K 6726 "Testing Method for Polyvinyl Alcohol".

The above-mentioned aldehyde used for producing the polyvinyl acetal resin is not particularly limited, and an example is an aldehyde having 1 to 10 carbon atoms. More specifically, such an aldehyde includes, for example, n-butyl aldehyde, isobutyl aldehyde, n-valeryl aldehyde, 2-ethylbutyl aldehyde, n-hexyl aldehyde, n-octyl aldehyde, n-nonyl aldehyde, n-decyl aldehyde, formaldehyde, acetaldehyde, benzaldehyde, and the like. These aldehydes may be used solely or in combination of two or more kinds thereof. Among them, n-butyl aldehyde, n-hexyl aldehyde, n-valeryl aldehyde, and the like are preferable, and n-butyl aldehyde of 4 carbon atoms is more preferable.

The polyvinyl acetal resin includes, but not particularly limited to, a polyvinyl formal resin obtained by reacting a polyvinyl alcohol resin with formaldehyde; a polyvinyl acetal resin (in a narrow sense) obtained by reacting a polyvinyl alcohol resin with acetaldehyde; a polyvinyl butyral resin obtained by reacting a polyvinyl alcohol resin with n-butyl aldehyde; and the like. These polyvinyl acetal resins may be used solely or in combination of two or more kinds thereof.

As the polyvinyl acetal resin, a polyvinyl butyral resin (PVB) is preferably used. By using the polyvinyl butyral resin, transparency and weatherability of the interlayer film, and its adhesion performance to a glass are much more improved.

A degree of acetalization of the polyvinyl acetal resin is preferably 60 to 85 mol %, more preferably 63 to 70 mol %. If the degree of acetalization is less than 60 mol %, compatibility of the plasticizer mentioned below with the polyvinyl acetal resin is poor, and a glass transition temperature of the interlayer film obtained is insufficiently lowered, thereby leading sometimes to deterioration of sound insulation performance in a low temperature range. In production of a polyvinyl acetal resin having a degree of acetalization exceeding 85 mol %, a long reaction time is required for its synthesis, and thus efficiency of its production may be decreased.

An amount of an acetyl group in the polyvinyl acetal resin is preferably 0.5 to 30 mol %, more preferably 0.5 to 25 mol %, and furthermore preferably 0.5 to 20 mol %.

If the amount of an acetyl group is less than 0.5 mol %, compatibility of the plasticizer mentioned below with the polyvinyl acetal resin becomes poor, and a glass transition temperature of the polyvinyl acetal resin obtained is not sufficiently lowered, so that sound insulation performance in a low temperature range may not be sufficiently improved. If a polyvinyl acetal resin having an amount of an acetyl group exceeding 30 mol % is intended to be produced, for example, reactivity between the polyvinyl alcohol resin and the aldehyde may be significantly lowered.

In the polyvinyl acetal resin, the sum of the degree of acetalization and the amount of an acetyl group is preferably 65 mol % or more, more preferably 68 mol % or more. If the sum of the degree of acetalization and the amount of an acetyl group is less than 65 mol %, compatibility of the plasticizer described later with the polyvinyl acetal resin is not sufficient, and a glass transition temperature of the polyvinyl acetal resin obtained is not sufficiently lowered, and thus, adaptability for a non-autoclave treatment may be insufficient.

The degree of acetalization of the polyvinyl acetal resin can be determined by calculating mol % by weight from the results of the amount of an acetyl group and the amount of a vinyl alcohol measured according to JIS K 6728 "Testing Method for Polyvinyl Butyral" or NMR method, and then by subtracting the amounts of both components, namely, the actyl group and the vinyl alcohol, from 100 mol % by weight.

Further, in the case where the polyvinyl acetal resin is a polyvinyl butyral resin, the degree of acetalization (degree of butyralization) and the amount of an acetyl group can be calculated from the measurement results obtained according to JIS K 6728 "Testing Method for Polyvinyl Butyral", IR (Infra red) absorption spectroscopy or NMR (Nuclear Magnetic Resonance) method.

The interlayer film for a laminated glass according to the present invention comprises 100 parts by weight of a polyvinyl acetal resin and 60 to 100 parts by weight of a plasticizer.

The characteristics of the present invention lies in that 50 to 100% by weight of the plasticizer is a diester compound represented by the formula (1). That is, in the interlayer film for a laminated glass of the present invention, the diester compound of the formula (1) is used as a plasticizer solely or in combination with other plasticizer (X) described later.

Moreover, in the formula (1), $R_1$ and $R_2$ are each an organic group of 5 to 10 carbon atoms, $R_3$ is $-CH_2-CH_2-$, $-CH_2-CH(CH_3)-$, $-CH_2-CH_2-CH_2-$, or $-CH_2-CH_2-CH_2-CH_2-$, and n is an integer of 4 to 10. The organic group of 5 to 10 carbon atoms includes, but not particularly limited to, for example, a linear alkyl group such as n-pentyl group, n-hexyl group, n-heptyl group, n-octyl group, n-nonyl group, and n-decyl group, and a branched alkyl group such as 2-ethylbutyl group and 2-ethylhexyl group.

If the plasticizer is in less than 60 parts by weight based on 100 parts by weight of the polyvinyl acetal resin, it is necessary to press-bond the interlayer film and the glass under high temperature and high pressure so as to increase adhesion between them in constituting a laminated glass. Conversely, if the amount of the plasticizer exceeds 100 parts by weight, bleed out is likely to occur. If the diester compound represented by the formula (1) is less than 50 parts by weight of the plasticizer, it is necessary to press-bond the interlayer film and the glass under high temperature and high pressure so as to increase adhesion between them in constituting a laminated glass. Further, since the adhesion of the interlayer film to the glass in a lower temperature range is possible, the amount of the plasticizer is preferably 65 parts by weight or more based on 100 parts by weight of the polyacetal resin, and more preferably 70 parts by weight based on 100 parts by weight of the polyacetal resin.

60 to 100% by weight of the plasticizer is preferably a diester compound of the formula (1). It is possible to adhere the interlayer film to the glass even at a much more lower temperature range in construction of the laminated glass, as a content of the diester compound of the formula (1) is increased. Further, since the interlayer film can be adhered to the glass at a much lower temperature, 65 to 100 parts by weight of the plasticizer is preferably a diester compound represented by the formula (1).

The diester compound represented by the formula (1), used as a plasticizer, is not particularly limited, but includes, for example, tetraethylene glycol di-2-ethylhexanoate, pentaethylene glycol di-2-ethylhexanoate, octaethylene glycol di-2-ethylhexanoate, nonaethylene glycol di-2-ethylhexanoate, decaethylene glycol di-2-ethylhexanoate, tetraethylene glycol di-n-hexanoate, tetraethylene glycol di-n-heptanoate, tetraethylene glycol di-n-octanoate, tetraethylene glycol di-2-ethylbutanoate, and the like.

Plasticizers (X) other than the diester compounds represented by the formula (1) are not particularly limited. Examples of such plasticizers are known plasticizers commonly used for polyvinyl acetal resins, for example, organic plasticizers such as monobasic organic acid esters, polybasic organic acid esters, and phosphoric acid plasticizers such as organic phosphates and organic phosphites. These plasticizers (X) may be used solely or in combination with two or more kinds thereof, and are selectively used in consideration of their compatibility depending on kind of polyvinyl acetal resins.

The monobasic organic acid ester includes, but not particularly limited to, for example, a glycol ester obtained by reacting a glycol (e.g. triethylene glycol, tripropylene glycol, etc.) with a monobasic organic acid (e.g. butyric acid, isobutyric acid, caproic acid, 2-ethylbuyric acid, heptanoic acid, heptylic acid, n-octylic acid, 2-ethylhexylic acid, pelargonic acid (n-nonylic acid), decylic acid, etc.). Among them, monobasic organic acid esters of triethylene glycol, such as triethylene glycol dicaproate, triethylene glycol di-2-ethylbutyrate, triethylene glycol di-n-octanoate, or triethylene glycol di-2-ethylhexanoate, are preferably used.

The polybasic organic acid ester includes, but not particularly limited to, for example, an ester obtained by reacting a polybasic acid (e.g. adipic acid, sebacic acid, azeleic acid, etc.) with a linear or branched alcohol of 4 to 8 carbon atoms, and among them, dibutyl sebacate, dioctyl azelate, dibutylcarbitol adipate, or the like is preferably used.

The organic phosphate plasticizer includes, but not particularly limited to, for example, triethylene glycol diethylbutyrate, triethylene glycol diethylhexoate, triethylene glycol dibutylsebacate, tributoxyethyl phosphate, isodecylphenyl phosphate, triisopropyl phosphate, and the like. Among them, triethylene glycol diethylbutyrate, triethylene glycol diethylhexoate, triethylene glycol dibutylsebacate, or the like is preferable.

In the present invention, where necessary, there may be added one or two or more kinds of various additives such as adhesiveness imparting agents, coupling agents, surfactants, antioxidants, heat stabilizers, light stabilizers, ultraviolet absorbers, colorants, dehydrating agents, antifoaming agents, antistatic agents, flame retardants, in addition to the essential components of polyvinyl acetal resins and plasticizers, so far as they do not inhibit achievement of solving the problem of the present invention.

The interlayer film for a laminated glass of the present invention can be obtained by molding a polyvinyl acetal resin composition containing a polyvinyl acetal resin and a plasticizer, as essential components, and various additives which are optionally added, or by forming a film of the composition in a usual manner.

The interlayer film for a laminated glass has a melt viscosity of not less than 10000 Pa·s at 110° C., preferably not more than 100000 Pa·s at 140° C. An interlayer film having a melt viscosity of not less than 10000 Pa·s at 110° C. and of not more than 100000 Pa·s at 140° C. shows more excellent adhesion performance.

In the case where the melt viscosity of an interlayer film for a laminated glass is less than 10000 Pa·s at 110° C., misalignment of glass sheets and generation of air bubbles therein occur in manufacturing the laminated glass, leading to its poor handling, and strength of the interlayer film becomes too weak, thereby penetration resistance of the laminated glass may be deteriorated when the laminated glass is manufactured. Also, in the case where the melt viscosity of an interlayer film for a laminated glass exceeds 100000 Pa·s at 140° C., difficulties are encountered in performing stable molding (film formation), and strength of the interlayer film for a laminated glass becomes too strong, resulting in deterioration of penetration resistance of the laminated glass when the laminated glass is manufactured.

A thickness of the interlayer film for a laminated glass is not particularly limited, but it is preferably 0.3 to 2.4 mm. Sound insulation performance itself becomes much more excellent as the interlayer film becomes thicker, however, in the case where the interlayer film becomes too thick, its thickness may become larger than that of a desired laminated glass when it is manufactured.

The laminated glass of the present invention is manufactured by interposing the interlayer film of the above-mentioned invention between at least two of transparent glass sheets, and then uniting them.

The above transparent glass sheets include the conventional inorganic transparent glass sheet, as well as organic transparent glass sheets such as polycarbonate sheets, and polymethyl methacrylate sheets.

The kind of the glass sheet includes, but not particularly limited to, for example, various inorganic or organic glass sheets such as float glass, polished glass, plate glass, bended glass, normal plate glass, figured glass, wire-reinforced glass, colored glass, and the like. Only one kind of these glasses may be used, or two or more kinds of such glasses may be used in combination. Further, a thickness of the above glass is not particularly limited, but is appropriately selected depending on its use and object.

Conventionally, production of a laminated glass was performed usually in the following manner. First, the interlayer film for a laminated glass of the invention is sandwiched with a pair of transparent glass sheets to obtain a laminated product. The laminated product is then placed in a rubber bag and adhered preliminary at 70 to 110° C. while suction and deaeration under reduced pressure. Using an autoclave, adhesion proceeding is carried out by an autoclave treatment through heating and pressing under the conditions of a temperature of about 140 to about 150° C. and a pressure of 0.98 to 1.47 MPa for 20 minutes, thereby to give a desired laminated glass.

Although the above autoclave treatment, which has been conducted heretofore in manufacturing a laminated glass may be adopted, such an autoclave treatment is not necessarily required, because the interlayer film for a laminated glass of the invention contains the diester compound of the formula (1) in a specific ratio. That is, even non-autoclave treatment makes it possible to adhere the interlayer film with a glass, and a transparent laminated glass having no residual air bubbles on the adhesion surface of the interlayer film and the glass can be obtained.

In the autoclave treatment, it is necessary to adhere the interlayer film to the glass under severe conditions of high temperature and high pressure. For performing such treatment, large-sized and expensive equipment was required, and cost for production inevitably became to be high. To the contrary, in the interlayer film for a laminated glass of the present invention, press-bonding of the interlayer film to the glass under high temperature and high pressure is not required.

In the production of a laminated glass using the interlayer film for a laminated glass of the present invention, for example, a laminated product wherein an interlayer is sandwiched with a pair of glass sheets is placed in a rubber bag to perform a preliminary adhesion at about 70 to about 110° C. under a reduced pressure of about 0.016 to about 0.020 MPa while suction and deaeration. Then, the laminated product is allowed to stand at 120 to 140° C. under a pressure of 0.016 to 0.020 MPa for 15 to 60 minutes, thereby to produce a laminated glass. That is, since it is not necessary to adhere the interlayer film to the glass under high temperature and high pressure, a large-sized and expensive equipment becomes unnecessary to reduce its production cost.

Hereinafter, the present invention will be elucidated by explaining Examples of the present invention and Comparative Examples. Further, the present invention is not construed to be limited to the following Examples.

(Polyvinyl Acetal Resins)
Polyvinyl Butyral Resin (PVB1):
Acetalation degree 69.0 mol %, acetyl group content 0.6 mol %, average polymerization degree 1700.
Polyvinyl Butyral Resin (PVB2):
Acetalation degree 68.0 mol %, acetyl group content 12.5 mol %, average polymerization degree 1900.
(Plasticizers)
Diester compounds of the formula (1).
(4GO)
A diester compound when $R_1$ and $R_2$ are each 2-ethylhexyl, $R_3$ is —$CH_2$—$CH_2$—, and n is 4 in the formula (1), i.e. a diester compound which is tetraethylene glycol di-n-ethylhexanoate.
(4GH)
A diester compound when $R_1$ and $R_2$ are each 2-ethylbutyl, $R_3$ is —$CH_2$—$CH_2$—, and n is 4 in the formula (1), i.e. a diester compound which is tetraethylene glycol di-n-ethylbutanoate.
(4G8)
A diester compound when $R_1$ and $R_2$ are each n-octyl, $R_3$ is —$CH_2$—$CH_2$—, and n is 4 in the formula (1), i.e. a diester compound which is tetraethylene glycol di-n-octanoate.
(5GO)
A diester compound when $R_1$ and $R_2$ are each 2-ethylhexyl, $R_3$ is —$CH_2$—$CH_2$—, and n is 5 in the formula (1), i.e. a diester compound which is pentaethylene glycol di-2-ethylhexanoate.
(8-10GO)
Diester compounds when $R_1$ and $R_2$ are each 2-ethylhexyl, $R_3$ is —$CH_2$—$CH_2$—, and n is an integer of 8 to 10 in the formula (1), i.e. diester compounds which are octaethylene glycol di-2-ethylhexanoate, nonaethylene glycol di-2-ethylhexanoate, or decaethylene glycol di-2-ethylhexanoate.
Other Plasticizers Other than the Diester Compounds of the Formula (1):
(3GO)
Triethylene glycol di-2-ethylhexanoate.

Example 1

To 100 parts by weight of the polyvinyl butyral resin (PVB1) were added 45 parts by weight of the diester compound (4GO) and 20 parts by weight of the diester compound (3GO) as a plasticizer, and the mixture was subjected to melt mixing in a mixing roll. After that, the product was press-molded at 150° C. for 30 minutes using a press and passed through an embossing roll. In this way, an interlayer film for a laminated glass having a thickness of 0.75 mm and having a pattern of inscribed lines (referred to as embossed line) on the surface was manufactured.

Examples 2 to 11 and Comparative Examples 1 to 4

Interlayer films for a laminated glass were manufactured in a similar manner to Example 1, except that the kind of the polyvinyl acetal resin, the kind of the plasticizer, and the mixing ratio were changed as shown in Table 1 below.
(Evaluation)
Each of the interlayer films for a laminated glass obtained in Examples and Comparative Examples was clipped between two transparent glass sheets, and adhered preliminary in a rubber bag at about 90° C. under a reduced pressure of about 0.016 MPa to about 0.020 MPa while performing suction and deaeration, thereby to obtain a laminated product. Subsequently, the laminated product was allowed to stand at 130° C. under a reduced pressure of about 0.016 MPa to about 0.020 MPa for 10 minutes to obtain a laminated glass. In each of Examples and Comparative Examples, three laminated glasses were respectively produced.

With respect to the three laminated glasses, the existence of residual air bubbles on the adhesion surface between the interlayer film and the glass, and the existence of a trace of embossed lines were evaluated with visual inspection according to the evaluation criteria described below.

○: No residual air bubbles were observed in any of the three laminated glasses and these glasses were all transparent, or no trace of embossed lines was observed in any of the three laminated glasses and these laminated glasses were all transparent.

Δ: Residual air bubbles were slightly observed in any one of the three laminated glasses, or a trace of embossed lines was slightly observed in any one of the three laminated glasses.

x: Residual air bubbles were clearly observed in at least one of the three laminated glasses, or a trace of embossed lines was clearly observed in any one of these three laminated glasses.

The results are shown in Table 1 below.

TABLE 1

| | | | Examples | | | | | | | | | | | Comparative Examples | | | |
|---|---|---|---|---|---|---|---|---|---|---|---|---|---|---|---|---|---|
| | | | 1 | 2 | 3 | 4 | 5 | 6 | 7 | 8 | 9 | 10 | 11 | 1 | 2 | 3 | 4 |
| Mixing Ratio | Polyvinyl Butyral Resin (PVB1) | Parts by Weight | 100 | 100 | | 100 | 100 | | 100 | | 100 | | 100 | 100 | 100 | | |
| | Polyvinyl Butyral Resin (PVB2) | Parts by Weight | | | 100 | | | 100 | | 100 | | 100 | | | | 100 | 100 |
| | 4GO | Parts by Weight | 45 | 60 | 60 | | | | | | | 70 | | | | | |
| | 4GH | Parts by Weight | | | | 45 | 65 | 65 | | | | | | | | | |
| | 4G8 | Parts by Weight | | | | | | | 65 | 60 | | | | | | | |
| | 5GO | Parts by Weight | | | | | | | | | 65 | | | | | | |
| | 8-10GO | Parts by Weight | | | | | | | | | | | 70 | | | | |
| | 3GO | Parts by Weight | 20 | | | 20 | | | | | | | | 40 | 60 | 40 | 60 |
| Evaluation | Existence of Residual Air Bubble | | ○ | ○ | ○ | ○ | ○ | ○ | ○ | ○ | ○ | ○ | ○ | ○ | X | ○ | Δ |
| | Existence of Trace of Embossed Line | | ○ | ○ | ○ | ○ | ○ | ○ | ○ | ○ | ○ | ○ | ○ | X | Δ | Δ | Δ |

The invention claimed is:

1. A laminated glass comprising a first transparent glass, a second transparent glass opposed to the first transparent glass and an interlayer film interposed between the first and second transparent glass, said interlayer film consisting of an interlayer film for a laminated glass, comprising 100 parts by weight of a polyvinyl acetal resin and 70 to 100 parts by weight of a plasticizer, wherein 60 to 100% by weight of the plasticizer is a diester compound represented by the formula (1) below:

[formula 1]

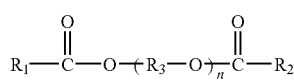

wherein $R_1$ and $R_2$ are each an organic group of 6 to 8 carbon atoms, $R_3$ is carbon atoms, $R_3$ is —$CH_2$—$CH_2$—, —$CH_2$—$CH(CH_3)$—, —$CH_2$—$CH_2$—$CH_2$— or —$CH_2$—$CH_2$—$CH_2$—$CH_2$—, and n is an integer of 4 to 10, and said interlayer film directly adhering to the first transparent glass and the second transparent glass.

2. A laminated glass comprising a first transparent glass, a second transparent glass opposed to the first transparent glass and an interlayer film interposed between the first and second transparent glass, said interlayer film consisting of an interlayer film for a laminated glass, comprising 100 parts by weight of a polyvinyl acetal resin and 70 to 100 parts by weight of a plasticizer, wherein 60 to 100% by weight of the plasticizer is a diester compound represented by the formula (1) below:

[formula 1]

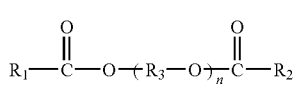

wherein $R_1$ and $R_2$ are each an organic group of 5 to 10 carbon atoms, $R_3$ is —$CH_2$—$CH_2$—, —$CH_2$—$CH(CH_3)$—, —$CH_2$—$CH_2$—$CH_2$— or —$CH_2$—$CH_2$—$CH_2$—$CH_2$—, and n is an integer of 4 to 10, and said interlayer film directly adhering to the first transparent glass and the second transparent glass.

3. A laminated glass comprising a first transparent glass, a second transparent glass opposed to the first transparent glass and an interlayer film interposed between the first and second transparent glass, said interlayer film consisting of an interlayer film for a laminated glass, comprising 100 parts by weight of a polyvinyl acetal resin and 70 to 100 parts by weight of a plasticizer, wherein 60 to 100% by weight of the plasticizer is a diester compound represented by the formula (1) below:

[formula 1]

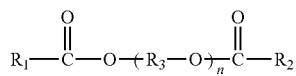
(1)

wherein $R_1$ and $R_2$ are each an organic group of 5 to 10 carbon atoms, $R_3$ is carbon atoms, $R_3$ is —$CH_2$—$CH_2$—, —$CH_2$—$CH(CH_3)$—, —$CH_2$—$CH_2$—$CH_2$— or —$CH_2$—$CH_2$—$CH_2$—$CH_2$—, and n is an integer of 4, and said interlayer film directly adhering to the first transparent glass and the second transparent glass.

4. A laminated glass comprising a first transparent glass, a second transparent glass opposed to the first transparent glass and an interlayer film interposed between the first and second transparent glass, said interlayer film consisting of an interlayer film for a laminated glass, comprising 100 parts by weight of a polyvinyl acetal resin and 70 to 100 parts by weight of a plasticizer, wherein 60 to 100% by weight of the plasticizer is a diester compound represented by the formula (1) below:

[formula 1]

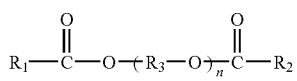
(1)

wherein $R_1$ and $R_2$ are each an organic group of 6 to 8 carbon atoms, carbon atoms, $R_3$ is —$CH_2$—$CH_2$—, —$CH_2$—$CH(CH_3)$—, —$CH_2$—$CH_2$—$CH_2$— or —$CH_2$—$CH_2$—$CH_2$—$CH_2$—, and n is an integer of 4, and said interlayer film directly adhering to the first transparent glass and the second transparent glass.

* * * * *